United States Patent
Uhl

(10) Patent No.: US 9,157,470 B2
(45) Date of Patent: Oct. 13, 2015

(54) CARBON FIBER REINFORCED PLASTIC PUSH/PULL ROD

(75) Inventor: Albert Uhl, Buehl (DE)

(73) Assignee: GMT Gummi-Metall-Technik GmbH, Buehl (DE)

( * ) Notice: Subject to any disclaimer, the term of this patent is extended or adjusted under 35 U.S.C. 154(b) by 72 days.

(21) Appl. No.: 13/695,055

(22) PCT Filed: Apr. 27, 2011

(86) PCT No.: PCT/EP2011/002095
§ 371 (c)(1),
(2), (4) Date: Jul. 2, 2013

(87) PCT Pub. No.: WO2011/134644
PCT Pub. Date: Nov. 3, 2011

(65) Prior Publication Data
US 2013/0276574 A1 Oct. 24, 2013

(30) Foreign Application Priority Data
Apr. 30, 2010 (DE) ...................... 20 2010 006 303 U

(51) Int. Cl.
*F16C 7/02* (2006.01)

(52) U.S. Cl.
CPC ............... *F16C 7/026* (2013.01); *Y02T 50/433* (2013.01); *Y10T 74/2142* (2015.01)

(58) Field of Classification Search
USPC ............ 74/579 R, 580, 581, 588, 593, 579 E, 74/579 F; 464/181, 183
IPC .......................................................... F16C 7/02
See application file for complete search history.

(56) References Cited

U.S. PATENT DOCUMENTS

| 4,038,885 | A | * | 8/1977 | Jonda | 74/581 |
| 4,666,372 | A | * | 5/1987 | Avila et al. | 416/134 A |
| 2005/0044984 | A1 | * | 3/2005 | Jones | 74/579 R |
| 2008/0129041 | A1 | * | 6/2008 | Allen et al. | 285/55 |

FOREIGN PATENT DOCUMENTS

GB 1162022 A * 8/1969 ............... F16C 7/02

* cited by examiner

*Primary Examiner* — Thomas Diaz
(74) *Attorney, Agent, or Firm* — Sheppard, Mullin, Richter & Hampton LLP

(57) ABSTRACT

A draw-pull bar is described which consists of at least one adapter with a metallic tubular end and of an inner and outer tubular body out of carbon-fiber-reinforced plastic (CFRP). It is characterized thus that the outer CFRP tubular body conically wraps the metallic end of the adapter from the outside in a form-fit manner while the inner CFRP tubular body is form-fit connected with the metallic ends of the adapter. An elastomeric layer is tapered in the contact area between the inner tubular body and the outer tubular body in such a way that both tubular bodies are separated on the one side, but are arranged against each other in a protected and damped manner on the other side.

2 Claims, 3 Drawing Sheets

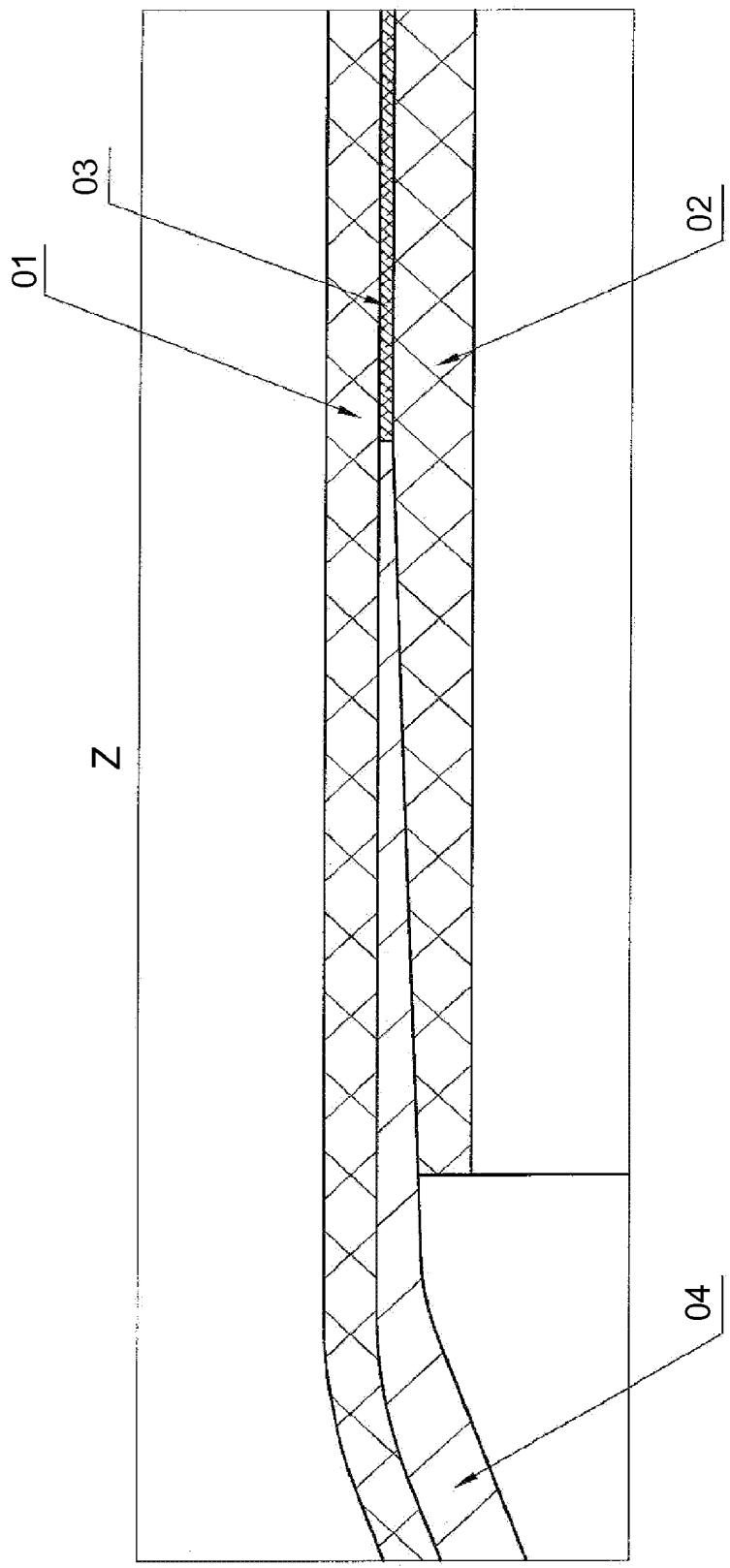

CARBON FIBER REINFORCED PLASTIC PUSH/PULL ROD

FIELD OF THE INVENTION

The invention concerns a draw-pull bar to provide mechanical guidance and support in aircraft construction. It can likewise be used in mechanical engineering and vehicle construction.

BACKGROUND OF THE INVENTION

Such draw-pull bars generally consist of a largely tubular body, at each end of which an adapter for assembling the draw-pull bar is located. Such draw-pull bars serve to transfer both tensile and compressive loads. Normally this type of tubular body is constructed from metallic materials; such as in particular stainless steel, aluminium and titanium. Such materials, however, have the disadvantage, especially in aircraft construction, of being too heavy, which waters down the benefit gained from the metal tube's tolerance of external damage. This therefore offers the opportunity, especially for draw-pull bars used in aircraft construction, to use lighter materials, such as carbon-fibre-reinforced of plastic (hereinafter referred to as "CFRP"). It is true that draw-pull bars made of CFRP are already known. These, however, consist exclusively of single-wall tubular bodies having a direct straightforward connection to the adapter, a construction that only, however, partially suits the requirements of the aircraft industry. The aircraft industry's generally strict testing guidelines require draw-pull bars to fulfil the purpose even when they have been externally damaged, and to transfer both tensile and compressive loads, as required. These requirements can, however, only be fulfilled by over-sized single-wall CFRP tubular bodies. This, in turn, presents the disadvantage of increased weight.

SUMMARY OF THE INVENTION

The task of the invention was therefore to find a composite material and construction for the draw-pull bar which would overcome the problem of weight while at the same time being immune to external damage (impact) and which, especially, retains virtually its uniform stability and which maintains its transfer forces, both in tension and compression, even in the event of external damage (impact).

The resilience experiments have proven that the ability of a CFRP tubular body damaged by impact to take on tensile loads is hardly affected, while the ability to take on compressive loads diminishes significantly. Therefore, the compression-loaded parts of the tubular body are especially to be protected from impact, whereas, surprisingly, the following multi-layer construction which differs from the inherently well-known single-layer tubular bodies made of carbon-fibre-reinforced plastic draw-pull bars proved extremely advantageous for solving this problem.

Figure 1:
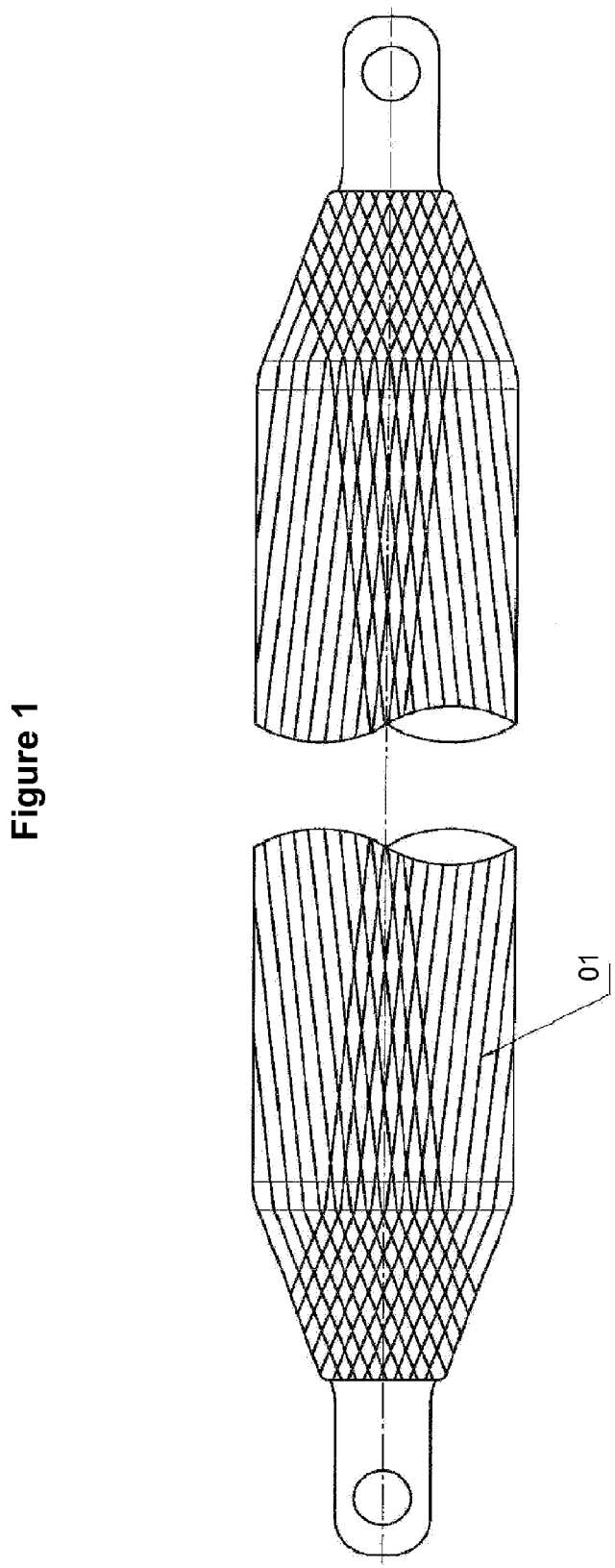
FIG. 1 show the overall perspective of the CFRP tubular body.
Figure 2:
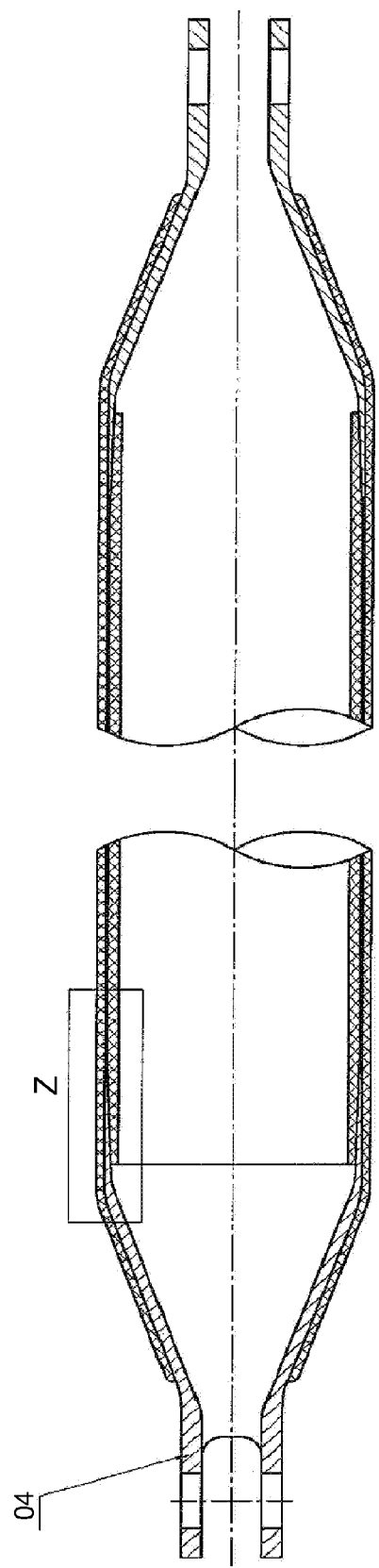

As can be seen in FIG. (2), the tubular body of the draw-pull bar as per the invention consists of two CFRP tubes, i.e. an external tube (1) and an inner tube (2) which are connected to the metallic extension of the adapter (4) (preferably a yoke end, a threaded sleeve or any other endpiece usual with such adapters).

The detailed view in FIG. 3 illustrates the layered structure.

DETAILED DESCRIPTION OF THE PRESENT INVENTION

The outer and inner CFRP tubular bodies (1) and (2) are positively connected with the metallic ends of the adapter (4) in such a way that the outer CFRP tubular body (1) is installed over the metallic extension of the adapter (4) in the form of a tapered tube, whereas the inner CFRP tubular body (2) is located under the metallic ends of the adapter in the form of an internal tube. In that regard, the outer CFRP tubular body (1) serves to transfer the tensile loads, while the inner CFRP tubular body (2) is intended for transferring compressive loads. This separate tensile and compressive transfer is achieved by the conical surface between the CFRP tubular body (1) and the metallic end of the adapter. The conical surfaces between the metallic end (4) and the outer CFRP tubular body (1) absorb the momentum arising from the tension, while the internal CFRP tubular body (2) absorbs the pressure. Since, however, according to experience, damage to the CFRP tubular body has a greater impact on the capacity of transferring or accepting compressive loads than it is the case with tensile loads, it is necessary to especially protect the compression-loaded components of the draw-pull bar, i.e. the inner CFRP tubular body (2). This occurs through the inner and outer CFRP tubular bodies (1) and (2) being separated from each other by a thin elastomeric layer. Through this it is achieved that the inner CFRP tubular body (2) is protected against damage arising from external influences (impact).

If the metallic ends of the adapter consist of aluminium, to prevent corrosion they need to be insulated from both ends of the CFRP tubular body using a glass fibre layer (GFL).

A composite of CFRP and elastomer is used as material for the tubular body. In this case there can be used either wet or prepreg (pre-impregnated fibres) wrapped tubes or, pultruded tubes or tubes manufactured using the duromer or thermoplastic RTM method for the compression-loaded parts of the inner CFRP tubular body (2). Construction-conditioned, only the wet or prepreg wrapping method can be used for the tensile-loaded outer CFRP tubular body (1).

Silicone rubber will preferably be used as the elastomer.

The CFRP draw-pull bar will, according to the invention, preferably be manufactured, using the following steps, in this order:

Firstly, the inner CFRP tubular body (2) will be wrapped wet or prepreg (using pre-impregnated fibres), pultruded or manufactured using the duromer or thermoplastic RTM method. Afterwards the elastomeric layer (3) will be vulcanised onto the CFRP tubular body (2). Subsequently, the metal end (4) will be attached and aligned, and thereafter the outer CFRP tubular body (1) will be manufactured using the wet or prepreg wrapping method and installed by wrapping the metal end of the adapter.

LIST OF REFERENCE SIGNS

1 Outer tubular body
2 Inner tubular body
3 Elastomeric layer
4 Adapter

The invention claimed is:

1. A draw-pull bar comprising at least one adapter (4) having a metallic tubular end and an inner and outer tubular body respectively made of carbon-fibre-reinforced plastic (CFRP), wherein the outer CFRP tubular body (1) conically wraps the metal end of the adapter (4) from the outside in a form-fit manner and the inner CFRP tubular body (2) is connected to the metal end of the adapter (4) from the inside in a form-fit manner, characterised in that the inner CFRP tubular body (2) is cladded, in a contact area with the outer CFRP tubular body (1), with an elastomeric layer (3) on the outside, which is thus located between the inner CFRP tubular body (2) and the inside of the outer CFRP body (1), separating them and providing thereby protection and insulation.

2. A draw-pull bar in accordance with claim 1, characterised in that, the multi-layered construction of the tubular body separates tension/compression load-bearing pressure in the draw-pull bar, with the outer CFRP tubular body (1), absorbing the tensile load, the inner CFRP tubular body (2), absorbing the compressive load, and the elastomeric layer (3) in between them, effectively protecting the inner CFRP tubular body (2) of the draw-pull bar by absorbing loads from damage (impact) caused by external actions.

* * * * *